(12) United States Patent
Lee et al.

(10) Patent No.: US 10,623,106 B2
(45) Date of Patent: Apr. 14, 2020

(54) ORTHOGONAL FREQUENCY DIVISION MULTIPLEXING SINGLE SIDEBAND TRANSMISSION OVER A WAVEGUIDE

(71) Applicant: Intel Corporation, Santa Clara, CA (US)

(72) Inventors: Hyung-Jin Lee, Portland, OR (US); Cho-ying Lu, Hillsboro, OR (US); Henning Braunisch, Phoenix, AZ (US); Telesphor Kamgaing, Chandler, AZ (US); Georgios Dogiamis, Chandler, AZ (US); Richard Dischler, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/224,008

(22) Filed: Dec. 18, 2018

(65) Prior Publication Data
US 2019/0149243 A1    May 16, 2019

(51) Int. Cl.
*H04B 10/516* (2013.01)
*H04B 10/2575* (2013.01)
(Continued)

(52) U.S. Cl.
CPC ..... *H04B 10/5165* (2013.01); *H04B 10/2575* (2013.01); *H04B 10/541* (2013.01); *H04B 10/612* (2013.01); *H04B 10/90* (2013.01); *H04B 10/40* (2013.01); *H04B 10/50* (2013.01); *H04B 10/61* (2013.01)

(58) Field of Classification Search
None
See application file for complete search history.

(56) References Cited

U.S. PATENT DOCUMENTS

| | | | |
|---|---|---|---|
| 2004/0240588 A1* | 12/2004 | Miller | H04K 1/00 375/340 |
| 2016/0226594 A1* | 8/2016 | Haas | H04B 10/516 |

(Continued)

OTHER PUBLICATIONS

Kim et al., "DFT-s-SSB OFDM System using New SSB Selection", 2018 19th IEEE Mediterranean Electrotechnical Conference (MELECON), Marrakech, 2018, pp. 42-45.

*Primary Examiner* — Darren E Wolf
(74) *Attorney, Agent, or Firm* — Patent Capital Group

(57) ABSTRACT

Embodiments herein may relate to an interconnect that includes a transceiver, where the transceiver is configured to receive a data stream, convert the data stream to a quadrature amplitude modulation (QAM) mapping/shaping signal, where the QAM mapping/shaping signal is a frequency component of the data stream, convert the QAM mapping/shaping signal to a Hilbert transform signal, where the Hilbert transform signal includes a reverse order of an in-phase component of the QAM mapping/shaping signal and a reverse order of a quadrature component of the QAM mapping/shaping signal, convert the Hilbert transform signal to a QAM mapping/shaping signal, where the QAM mapping/shaping signal is a single sideband (SSB) time domain mm wave signal, where the SSB time domain mm wave signal is the Hilbert transform signal converted to a time domain signal, and communicate the SSB time domain mm wave signal over a waveguide using a waveguide interconnect.

20 Claims, 7 Drawing Sheets

(51) Int. Cl.
    *H04B 10/61*     (2013.01)
    *H04B 10/90*     (2013.01)
    *H04B 10/54*     (2013.01)
    *H04B 10/40*     (2013.01)
    *H04B 10/50*     (2013.01)

(56) References Cited

U.S. PATENT DOCUMENTS

| | | | |
|---|---|---|---|
| 2017/0214485 A1* | 7/2017 | Yu | H04L 27/2601 |
| 2017/0317760 A1* | 11/2017 | Yu | H04B 10/5161 |
| 2018/0275822 A1* | 9/2018 | Suzuki | G06F 3/0418 |

* cited by examiner

ORTHOGONAL FREQUENCY DIVISION MULTIPLEXING SINGLE SIDEBAND TRANSMISSION OVER A WAVEGUIDE

FIELD

Embodiments of the present disclosure generally relate to the field of waveguides and more particularly to orthogonal frequency division multiplexing (OFDM) single sideband (SSB) transmissions over a waveguide

BACKGROUND

Emerging network trends in data centers and cloud systems place increasing performance demands on a system. For example, the ever-increasing demand for bandwidth triggered by mobile and video Internet traffic requires advanced interconnect solutions. Depending upon the frequencies, power levels, and physical requirements, waveguide interconnects are often used for high power radio frequency and microwave applications. A waveguide is a structure that guides waves and as used herein, the term "waveguide" refers to any linear structure that conveys electromagnetic waves between endpoints. The dimensions of the waveguide determine which wavelengths it can support, and in which modes. Typically, the waveguide is operated so that only a single mode is present. The lowest order mode possible is generally selected. Frequencies below the waveguide's cutoff frequency will not propagate.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1:
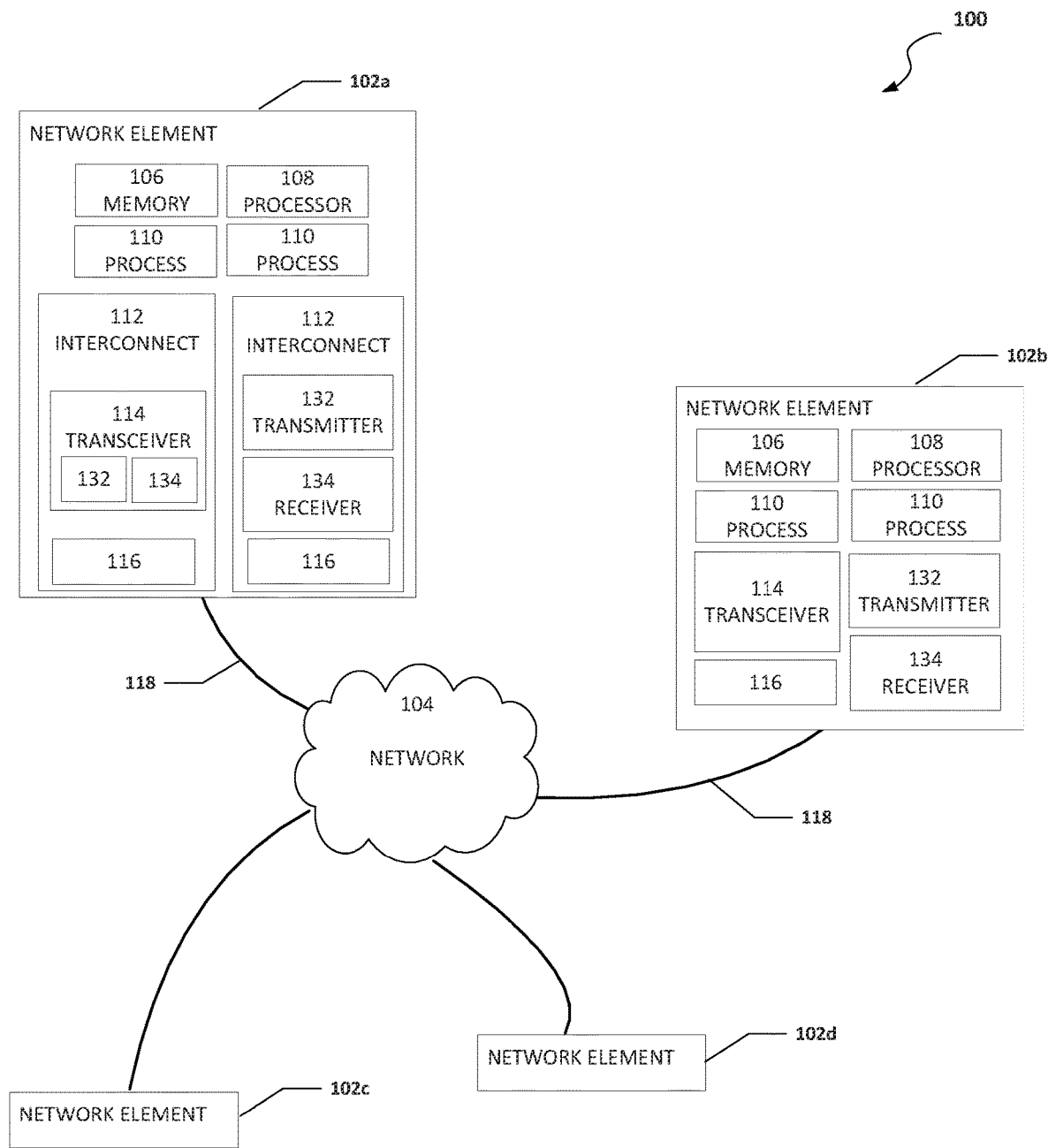
FIG. 1 illustrates an example system that may use an orthogonal frequency division multiplexing single sideband transmission over a waveguide, in accordance with various embodiments.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to a system for enabling an orthogonal frequency division multiplexing single sideband transmission over a waveguide in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent. As used herein, the term "module" may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 is a block diagram of a system 100 to enable an orthogonal frequency division multiplexing (OFDM) single sideband (SSB) millimeter (mm) wave transmission over a waveguide, in accordance with an embodiment of the present disclosure. A mm wave, sometimes referred to as an extremely high frequency (EHF) wave or a very high frequency (VHF) wave, is defined as having a frequency between about 30 gigahertz (GHz) to about 300 GHz. System 100 can include one or more network elements 102a-102d. Each network element 102a-102d can be in communication with each other using network 104. In an example, network elements 102a-102d can be in communication with each other using a waveguide 118. In some examples, network elements 102a-102d and network 104 are part of a data center.

Each network element 102a-102d can include memory, a processor, and one or more interconnects. For example, network elements 102a and 102b can include memory 106, a processor 108, and one or more interconnects 112. Each interconnect 112 can include a waveguide interconnect 116 for communication over waveguide 118. Each process 110 may be a process, application, function, virtual network function (VNF), etc. Waveguide 118 can be an uncladded dielectric, a dielectric with a conductive cladding surrounding the dielectric, or a dielectric with a conductive cladding surrounding the dielectric and containing a conductor.

In some embodiments, one or more interconnects 112 can include one or more transceivers 114. Each transceiver 114 can include a transmitter 132 and/or a receiver 134. In other embodiments, one or more interconnects 112 may not include a transceiver 114 and can include one or more transmitters 132 and/or one or more receivers 134. In yet other embodiments, a network element may not include an interconnect or a transceiver, or a transmitter and/or a receiver may not be part of an interconnect (e.g., network element 102b does not include interconnect 112 but does include transceiver 114, waveguide interconnect 116, transmitter 132, and receiver 134). While specific embodiments are illustrated in FIG. 1, other embodiments having or omitting one or more interconnects, one or more transceivers, one or more transmitters, and/or one or more receivers will be apparent to those skilled in the art.

In an illustrative example, system 100 can include an OFDM SSB transceiver that uses a traditional OFDM modulation scheme with a Hilbert transform in the frequency domain to eliminate either a negative or a positive side frequency component in the baseband spectrum. Unlike an SSB-OFDM system that creates an SSB sub-carrier signal to try and improve the sub-carrier band efficiency, system 100 can be configured to create an entire OFDM baseband signal as a single-sidebanded baseband signal. The SSB signaling can help to mitigate the frequency dispersion problem caused by folding an upper and lower band together as a result of down-conversion. In addition, at the receiver side, SSB signaling can help reduce the interference by folding the upper and lower bands on top of each other after demodulation that dual sideband signaling may introduce.

SSB processing relaxes multiplexer requirements and also mitigates the signal interference issue caused by double-sideband folding with different frequency dispersion that upper and lower sideband experience. Also, the SSB processing can make the band transition sharper, which reduces the interference level between separated OFDM bands. Using an SSB signal can help to achieve increased bandwidth (BW) density compared to dielectric waveguide only approaches. Narrow sub-carrier band in frequency domain quadrature amplitude modulation (QAM) can be used to provide immunity to wideband frequency dispersion.

End users have more media and communications choices than ever before. A number of prominent technological trends are currently afoot (e.g., more computing devices, more online video services, more Internet traffic), and these trends are changing the media delivery landscape. Data centers serve a large fraction of the Internet content today, including web objects (text, graphics, Uniform Resource Locators (URLs) and scripts), downloadable objects (media files, software, documents), applications (e-commerce, portals), live streaming media, on demand streaming media, and social networks. In addition, devices, and systems, such as data centers, are expected to increase performance and function. This demand is further accelerated with the advent of applications requiring deep learning (DL) and artificial intelligence (AI). However, the increase in performance and/or function can cause bottlenecks within the resources of the data center and electronic devices in the data center.

As a result of the increased need for higher bandwidth, ultra-wideband wideband communication systems are being considered as a possible alternative to electrical and optical interconnects in datacenter and high-performance computing applications. This requires a waveguide signaling system that maximizes achievable throughput while minimizing power consumption to try and optimize link power efficiency as waveguide dispersion can severely limit the achievable data rate and, thus, throughput.

However, one issue with some current ultra-wideband or wideband communication systems is frequency dispersion that can introduce non-constant group delay across the bandwidth. The frequency dispersion of the waveguide limits the total signal bandwidth, even though the waveguide channel itself provides an extremely wide bandwidth. The frequency dispersion can cause inter-symbol-interference (ISI) when a double-sideband signal is down converted to a baseband signal at a receiver side after experiencing the frequency dispersion over the waveguide channel. The amount of ISI depends on the total signal bandwidth and the amount of the frequency dispersion. If the signal bandwidth is wide, the amount of ISI will take an unreasonably long chain of equalizers to correct it and it is often unrealistic. In addition, dual sideband signaling may introduce interference by folding the upper and lower bands on top of each other after demodulation at the receiver side.

The most widely used solution to achieve high data rate communication without such pronounced frequency dispersion issue is fiber optic communication, which requires photonic devices and optical fibers as the transmission medium. Typically, fiber optics is associated with high-cost and may be power-inefficient especially for short to medium interconnects. Moreover, such systems are associated with low assembly tolerance and large temperature sensitivity. Maintenance cost associated with fiber optics systems is a further disadvantage.

An alternative solution is using baseband signaling and regular copper twin axial cables that support a substantially non-dispersive transverse electromagnetic (TEM) mode. However, coaxial TEM lines cannot be utilized efficiently at mm-wave frequencies since the insertion losses of such waveguides are large (>20 dB/m at 140 gigahertz (GHz)). One solution is to utilize metallic clad waveguides, that provide insertion losses less than 10 dB/m at 140 GHz. However, metallic clad waveguides can be very dispersive (e.g., greater than 1 ns/m over 40-50 GHz of single-mode bandwidth) and would limit the maximum achievable datarate of the waveguide channel. Another solution is to design low dispersion waveguides, such as dielectric only waveguides that may offer more than four times dispersion reduction relative to metallic clad dielectric waveguides. Dielectric only waveguides are a good offering when studying their loss and dispersion characteristics, but the problem these channels face is a low field confinement that leads to reduced BW density due to the large pitch between neighboring channels (for achieving low cross-talk). Another solution would be to use a multiplexer to create a non-orthogonal FDM of the available single-mode bandwidth. However, multiplexing non-orthogonal FDM systems introduce a lot of challenges mainly because of the multiplexer implementation on-die (large die area and increased insertion losses). Typically, passive multiplexers are adopted for multi-band systems, but the passive multiplexer generally occupies a relatively large die or package area and introduces extra losses that make it even more challenging to maintain the required signal to noise ratio. Therefore, what is needed is a system, method, apparatus, etc. to overcome some of the deficiencies of current systems that use a dual sideband (DSB) signaling scheme. More specifically, what is needed is a system, method, apparatus, etc. to enable an OFDM SSB transmission over a waveguide.

A system to enable an OFDM SSB transmission over a waveguide, as outlined herein, can resolve these issues (and others). More specifically, embodiments herein may include a transceiver that is configured for a digital (or mixed-signal) baseband signal generator to generate OFDM signals in only an upper or a lower sideband. This can help to mitigate the frequency dispersion problem by dividing the signal bandwidth into narrow sub-bands and help to eliminate or reduce interference by folding upper and lower bands together on the receiver side. In addition, system 100 can be configured for a single-side passband signaling to mitigate the needs of a multiplexer with sharp band transition by digital signal processing.

In an example, system 100 can process a baseband transmit (TX) data signal to help eliminate one sideband. More specifically, system 100 can use a series to parallel data conversion for grouping multiple series data bit streams into a parallel data word as a symbol. QAM mapping can be used to map the symbol to a dedicated QAM constellation, which is a complex number (e.g., symbol[1:n], where n is the length of the symbol stream). A frequency domain Hilbert transform can be used to create two sets of QAM mapped symbol streams. One stream (e.g., the original symbol stream) can be a cascading reversed order of a conjugated symbol stream, such as [0, symbol[1:n], symbol'[n:1]]. A second stream (e.g., a Hilbert transformed symbol stream) can be a cascading reversed order of the conjugated and negative symbol stream, such as [0, symbol[1:n], -symbol'[n:1]]. The zero insertion is for DC representation.

An inverse fast Fourier transform (IFFT) can be performed for the two symbol streams (e.g., the original stream and the Hilbert transformed symbol stream). The IFFT is the time domain representation of the OFDM SSB with frequency domain QAM. In some examples, a cyclic prefix can be added to help protect the signal from inter-symbol interference (ISI).

Combining both output of the IFFT can help to negate the negative frequency part of the spectrum. The time domain data stream is complex with an "I" (in-phase component portion) and a "Q" (quadrature or imaginary portion) and the digital data stream can be separately converted to an analog signal through a digital-to-analog (DAC) converter after symbol shaping. In some examples, a raised cosine filter may be used.

Positive band elimination can be achieved by adding negative gain to the non-conjugated portion of the symbol stream during the Hilbert transform (e.g., [0, -symbol[1:n], symbol'[n:1]]). Data recovery can be achieved by performing the reverse operation (e.g., I/Q demodulation, then I/Q sampling (analog-to-digital conversion (ADC)), then fast Fourier transform (FFT)). The first half of the FFT output contains the symbol stream and the second half of the FFT output contains the channel noise. The noise cancellation process can be achieved by using the second half of FFT output and then QAM de-mapping for data recovery. In an illustrative example, the transition outside of the 16 GHz band is relatively sharp and allows an adjacent OFDM channel to be located very close to other OFDM channels. This enables the nonplexer architecture, where neighboring bands do not need to pass thru a multiplexer to achieve additional isolation.

Elements of FIG. 1 may be coupled to one another through one or more interfaces employing any suitable connections (wired or wireless), which provide viable pathways for network (e.g., network 104, etc.) communications. Additionally, any one or more of these elements of FIG. 1 may be combined or removed from the architecture based on particular configuration needs. System 100 may include a configuration capable of Transmission Control Protocol/Internet Protocol (TCP/IP) communications for the transmission or reception of packets in a network. System 100 may also operate in conjunction with a User Datagram Protocol/IP (UDP/IP) or any other suitable protocol where appropriate and based on particular needs.

Turning to the infrastructure of FIG. 1, system 100 in accordance with an example embodiment is shown. Generally, system 100 may be implemented in any type or topology of networks. Network 104 represents a series of points or nodes of interconnected communication paths for receiving and transmitting packets of information that propagate through system 100. Network 104 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Message Passing Interface (MPI), Open Systems Interconnection (OSI) model, or any derivations or variants thereof (e.g., TCP/IP, User Datagram Protocol/IP (UDP/IP)). Messages through the network could be made in accordance with various network protocols, (e.g., Ethernet, MPI, Infiniband, Omni-Path, etc.). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, network elements 102a-102d, are meant to encompass network elements, network appliances, servers, routers, switches, gateways, bridges, load balancers, processors, modules, or any other suitable device, component, element, or object operable to exchange information in a network environment. Network elements 102a-102d may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of network elements 102a-102d may be virtual or include virtual elements.

Figure 2:
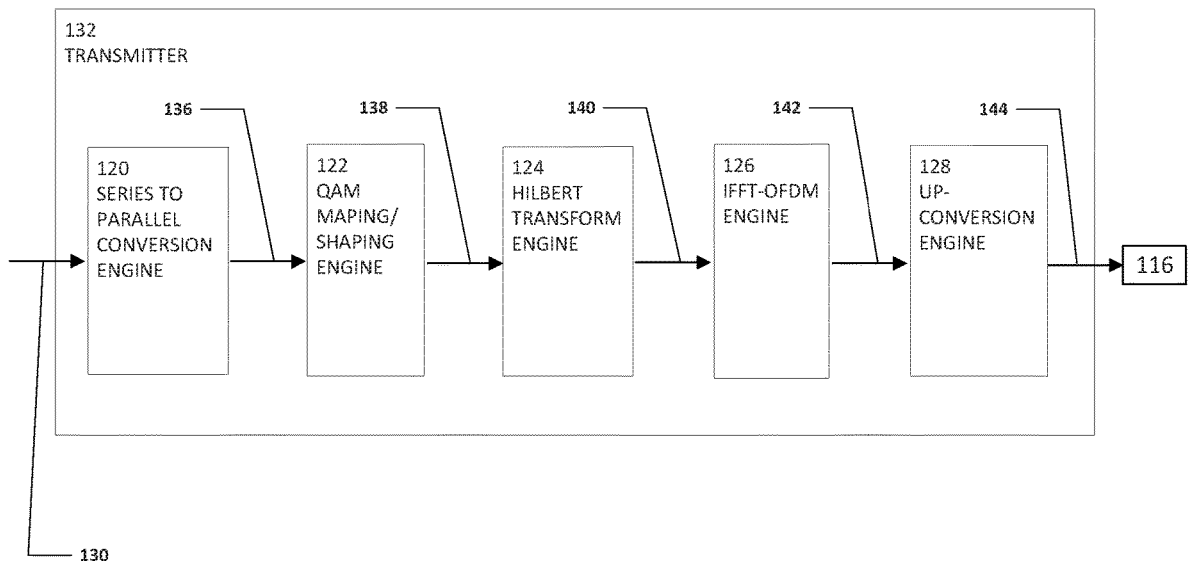
FIG. 2 illustrates an example portion of a system that may use an orthogonal frequency division multiplexing single sideband transmission over a waveguide, in accordance with various embodiments.

Turning to FIG. 2, FIG. 2 is a simplified block diagram of an example of a transmitter 132 for use in system 100. Transmitter 132 includes a QAM mapping/shaping engine 122, a Hilbert transform engine 124, IFFT-OFDM engine 126, and upconversion engine 128. In some examples, transmitter 132 can also include a series to parallel conversion engine 120. If input data stream 130 is in series, series to parallel conversion engine 120 can be configured to receive input data stream 130 and convert input data stream 130 to a parallel data stream 136. If input data stream 130 is already in parallel or the system requires a partial series to parallel conversion, then series to parallel conversion engine 120 may not be present. Parallel data stream 136 can be communicated to QAM mapping/shaping engine 122.

QAM mapping/shaping engine 122 can create a QAM mapping/shaping signal 138 by mapping each individual symbol in parallel data stream 136 to a complex number that has a different amplitude and different phase than the corresponding symbol in the data stream. The QAM mapping/shaping engine 122 can be configured for QAM16 mapping (a four to one modulation), QAM64 mapping (a six to one modulation), QAM256 mapping (an eight to one modulation), QAM1024 mapping (a ten to one modulation), etc. QAM mapping/shaping signal 138 can be treated as the frequency component and can include an in-phase component portion and a quadrature component portion. QAM mapping/shaping signal 138 is communicated to Hilbert transform engine 124.

Hilbert transform engine 124 can perform a Hilbert transform on QAM mapping/shaping signal 138 to create a Hilbert transform signal 140. Hilbert transform engine 124 can create a reverse order of the in-phase component portion of QAM mapping/shaping signal 138 and a reverse order of the quadrature component portion of QAM mapping/shaping signal 138. Hilbert transform signal 140 can include the in-phase component portion of QAM mapping/shaping signal 138, a reverse order of the in-phase component portion of QAM mapping/shaping signal 138, the quadrature component portion of QAM mapping/shaping signal 138, and a reverse order of the quadrature component portion of QAM mapping/shaping signal 138.

IFFT-OFDM engine 126 can receive Hilbert transform signal 140, and convert Hilbert transform signal 140 to an SSB time domain signal 142. SSB time domain signal 142 can be communicated to upconversion engine 128 for upconversion and an upconverted signal 144 can be communicated to waveguide interconnect 116 for communication over a waveguide 118. In an illustrative example, IFFT-OFDM engine 126 can convert Hilbert transform signal 140 to a conjugate version and minus version. The conjugate version and minus version can be combined together by upconversion engine 128 to cancel out the negative frequency components and create an SSB signal for communication over waveguide 118. In a more specific example, IFFT-OFDM engine 126 can copy Hilbert transform signal 140 and convert the copy into a conjugate version of Hilbert transform signal 140. A minus version of the original Hilbert transform signal 140 in the conjugate version can also be created by IFFT-OFDM engine 126. The minus version of the original Hilbert transform signal 140 in the conjugate version represents the DSB of the data bandwidth. A second signal is the same DSB and the negative frequency component is reversed in polarity. The signals can all be combined to generate a time domain stream and can be merged together in the time domain after upconversion. The positive polarity of the negative frequency component of Hilbert transform signal 140 and the negative polarity of the negative frequency component of the conjugate version cancel each other out to create a signal where the negative frequency component of Hilbert transform signal 140 is removed. In another example, the positive polarity of the positive frequency component of Hilbert transform signal 140 and the negative polarity of the positive frequency component of the conjugate version cancel each other out to create a signal where the negative frequency component of Hilbert transform signal 140 is removed.

Figure 3:
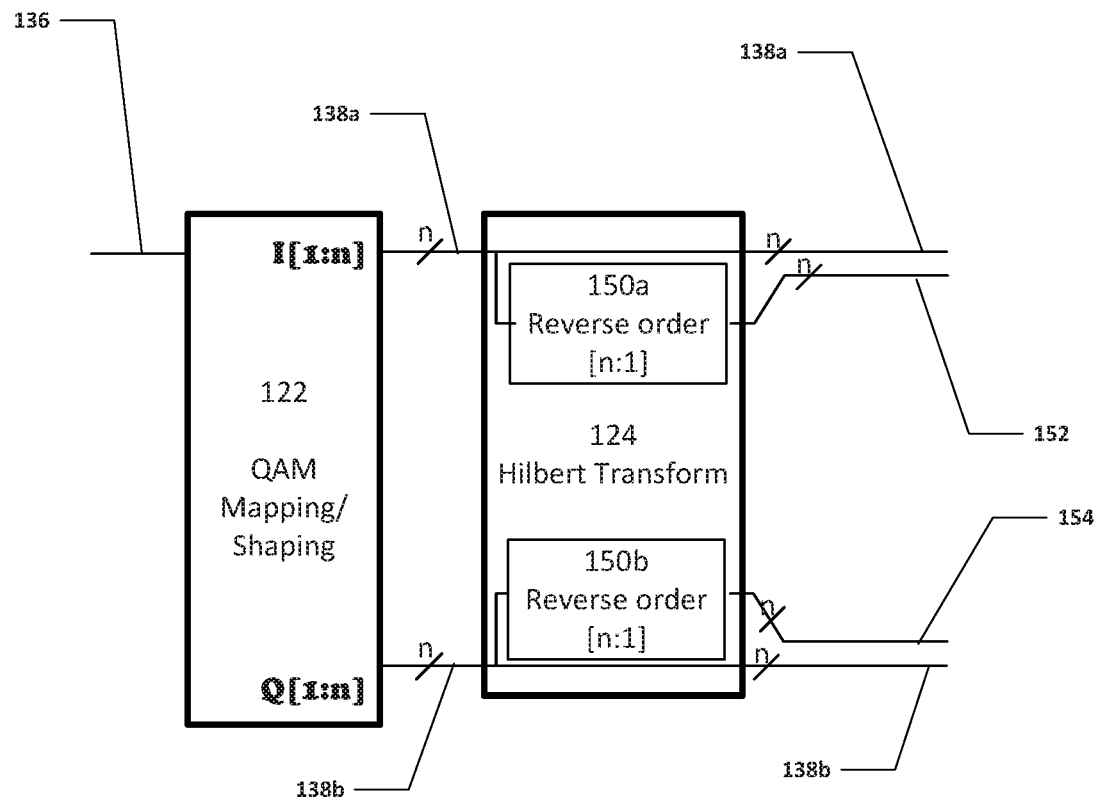
FIG. 3 illustrates an example portion of a system that may use an orthogonal frequency division multiplexing single sideband transmission over a waveguide, in accordance with various embodiments.

Turning to FIG. 3, FIG. 3 is a simplified block diagram of an example of a portion of a transmitter 132 (not shown) for use in system 100. Transmitter 132 can include QAM mapping/shaping engine 122 and Hilbert transform engine 124. Hilbert transform engine 124 can include reverse order engines 150a and 150b. In an illustrative example, QAM mapping/shaping engine 122 can receive a parallel data stream 136 (e.g., from series to parallel conversion engine 120) and convert parallel data stream 136 to an in-phase component QAM mapping/shaping signal 138a and a quadrature component QAM mapping/shaping signal 138b.

QAM mapping/shaping engine 122 can be configured to convey two digital bit streams (in-phase component QAM mapping/shaping signal 138a and quadrature component QAM mapping/shaping signal 138b), by changing or modulating the amplitudes of carrier waves using an amplitude-shift keying (ASK) digital modulation. In-phase component QAM mapping/shaping signal 138a and a quadrature component QAM mapping/shaping signal 138b are of the same frequency, usually sinusoids, and are out of phase with each other by ninety degrees. These are often called the "I" or in-phase component, and the "Q" or quadrature component. In-phase component QAM mapping/shaping signal 138a can be the "I" or in-phase component (e.g., I[1:n]) and quadrature component QAM mapping/shaping signal 138*b* can be the "Q" or quadrature component (e.g., j*Q[1:n]).

Hilbert transform engine 124 can be configured to receive in-phase component QAM mapping/shaping signal 138*a*, copy in-phase component QAM mapping/shaping signal 138*a*, and use reverse order engine 150*a* to reverse the order of in-phase component QAM mapping/shaping signal 138*a* to create a reversed in-phase component QAM mapping/shaping signal 152. In-phase component QAM mapping/shaping signal 138*a* and reversed in-phase component QAM mapping/shaping signal 152 can be communicated to IFFT-OFDM engine 126*a* (illustrated in FIG. 4). In addition, Hilbert transform engine 124 can be configured to receive quadrature component QAM mapping/shaping signal 138*b*, copy quadrature component QAM mapping/shaping signal 138*b*, and use reverse order engine 150*b* to reverse the order of quadrature component QAM mapping/shaping signal 138*b* to create a reversed quadrature component QAM mapping/shaping signal 154. Quadrature component QAM mapping/shaping signal 138*b* and reversed quadrature component QAM mapping/shaping signal 154 can be communicated to IFFT-OFDM engine 126*b* (illustrated in FIG. 4).

Figure 4:
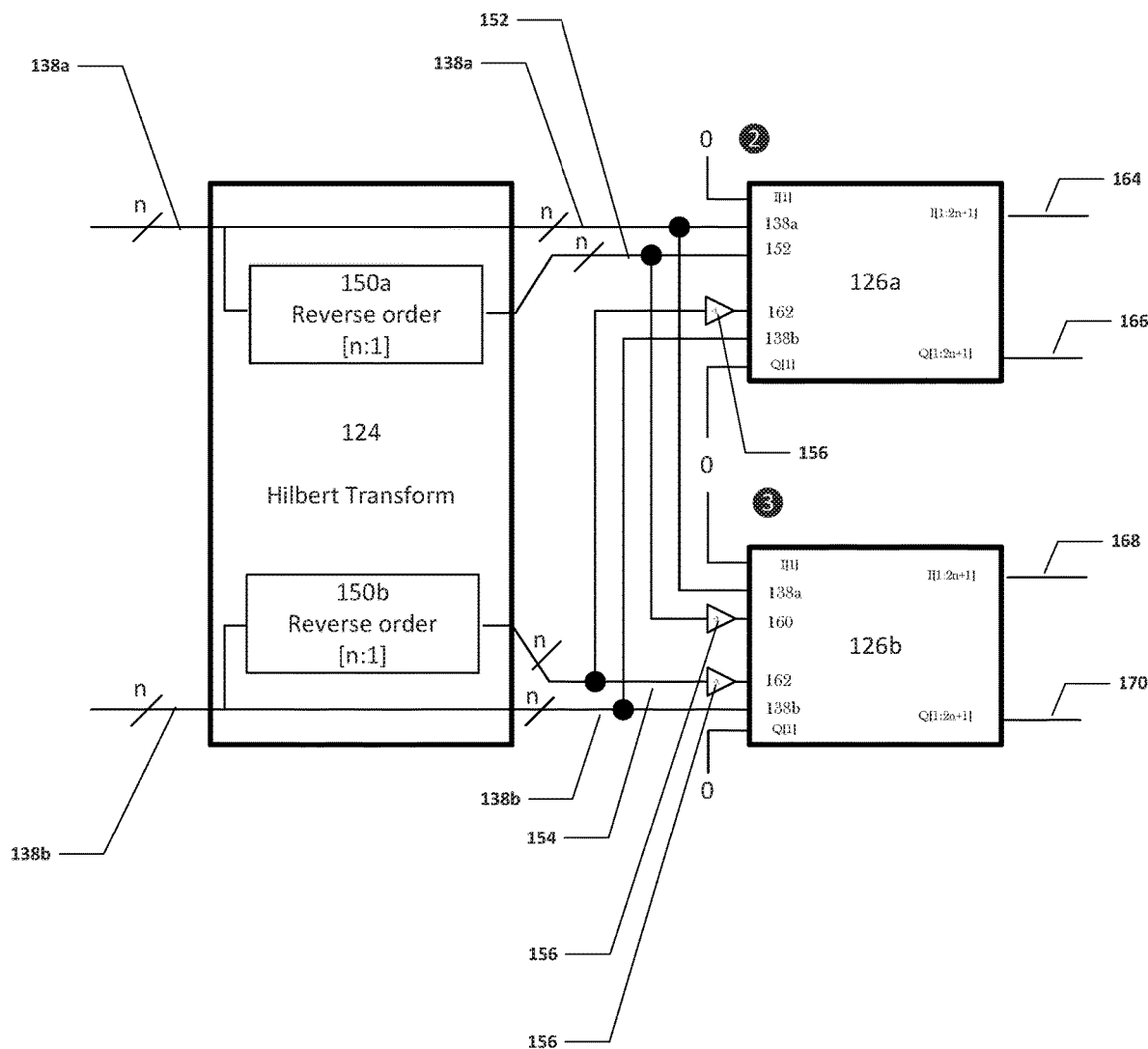
FIG. 4 illustrates an example portion of a system that may use an orthogonal frequency division multiplexing single sideband transmission over a waveguide, in accordance with various embodiments.

Turning to FIG. 4, FIG. 4 is a simplified block diagram of an example of a portion of a transmitter 132 for use in system 100. As illustrated in FIG. 4, in-phase component QAM mapping/shaping signal 138*a* can be communicated to IFFT-OFDM engine 126*a* and to IFFT-OFDM engine 126*b* from Hilbert transform engine 124. In addition, reversed in-phase component QAM mapping/shaping signal 152 can be communicated to IFFT-OFDM engine 126*a* and to IFFT-OFDM engine 126*b* from reverse order engine 150*a* in Hilbert transform engine 124, where reversed in-phase component QAM mapping/shaping signal 152 is communicated to an inverter 156 to create an inverted reversed in-phase component QAM mapping/shaping signal 160 and inverted reversed in-phase component QAM mapping/shaping signal 160 is communicated to IFFT-OFDM engine 126*b*.

Also, quadrature component QAM mapping/shaping signal 138*b* can be communicated to IFFT-OFDM engine 126*a* and to IFFT-OFDM engine 126*b* from Hilbert transform engine 124. Further, reversed quadrature component QAM mapping/shaping signal 154 can be communicated to IFFT-OFDM engine 126*a* and to IFFT-OFDM engine 126*b* from reverse order engine 150*b* in Hilbert transform engine 124, where reversed quadrature component QAM mapping/shaping signal 154 is communicated to an inverter 156 to create an inverted reversed quadrature component QAM mapping/shaping signal 162 and inverted reversed quadrature component QAM mapping/shaping signal 162 is communicated to IFFT-OFDM engine 126*a* and IFFT-OFDM engine 126*b*.

IFFT-OFDM engine 126*a* can receive in-phase component QAM mapping/shaping signal 138*a*, quadrature component QAM mapping/shaping signal 138*b*, reversed in-phase component QAM mapping/shaping signal 152, and inverted reversed quadrature component QAM mapping/shaping signal 162 (e.g., [0,I[1:n],I[n:1]]+j*[0,Q [1:n],−Q [n:1]]) and combine and convert the signals to a time domain representation of the OFDM SSB with frequency domain QAM and create an in-phase time domain signal 164 and a quadrature time domain signal 166. IFFT-OFDM engine 126*b* can receive in-phase component QAM mapping/shaping signal 138*a*, quadrature component QAM mapping/shaping signal 138*b*, inverted reversed in-phase component QAM mapping/shaping signal 160, and inverted reversed quadrature component QAM mapping/shaping signal 162 (e.g., [0,U[1:n],−I[n:1]]+j*[0,Q[1:n],−Q[n:1]]) and combine and convert the signals to a time domain representation of the OFDM SSB with frequency domain QAM and create an in-phase time domain signal 168 and a quadrature time domain signal 170.

Figure 5:
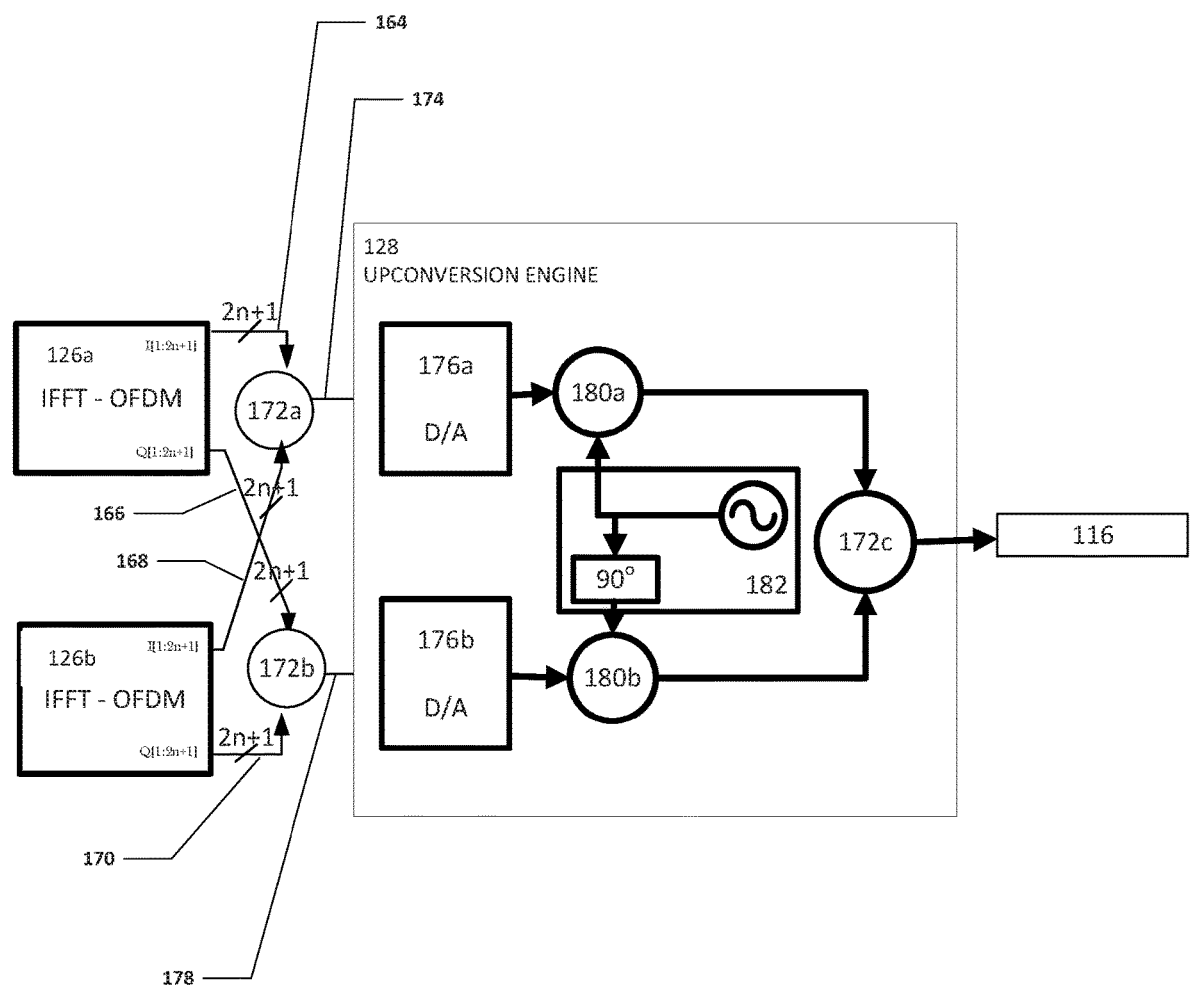
FIG. 5 illustrates an example portion of a system that may use an orthogonal frequency division multiplexing single sideband transmission over a waveguide, in accordance with various embodiments.

Turning to FIG. 5, FIG. 5 is a simplified block diagram of an example of a portion of a transmitter 132 for use in system 100. As illustrated in FIG. 5, IFFT-OFDM engine 126*a* can communicate in-phase time domain signal 164 to combiner 172*a* and IFFT-OFDM engine 126*b* can communicate in-phase time domain signal 168 to combiner 172*a*. In addition, IFFT-OFDM engine 126*a* can communicate quadrature time domain signal 166 to combiner 172*b* and IFFT-OFDM engine 126*b* can communicate quadrature time domain signal 170 to combiner 172*b*.

Combiner 172*a* can combine in-phase time domain signal 164 and in-phase time domain signal 168 to create combined in-phase time domain signal 174. Combined in-phase time domain signal 174 can be communicated to digital to analog engine 176*a*. Combiner 172*b* can combine quadrature time domain signal 166 and quadrature time domain signal 170 to create combined quadrature time domain signal 178. Combined quadrature time domain signal 178 can be communicated to digital to analog engine 176*b*.

Digital to analog engine 176*a* can convert combined in-phase time domain signal 174 from a digital signal to an analog signal and digital to analog engine 176*b* can convert combined quadrature time domain signal 178 from a digital signal to an analog signal. The analog signals can be upconverted using mixers 180*a* and 180*b* and phase shifter block 182. The resulting output signals of the mixers 180*a* and 180*b* are then communicated to a combiner 172*c*. Combiner 172*c* can combine the signals and communicate them to waveguide interconnect 116 for communication over a waveguide 118

In an example, a cyclic prefix can be added after every symbol. The cyclic prefix can give an idle period between the symbols so if there is inter-symbol interference, the inter-symbol interference should die out before the next symbol comes in. If a cyclic prefix is added, data bandwidth may be lost but the bit error rate would be improved.

Figure 6:
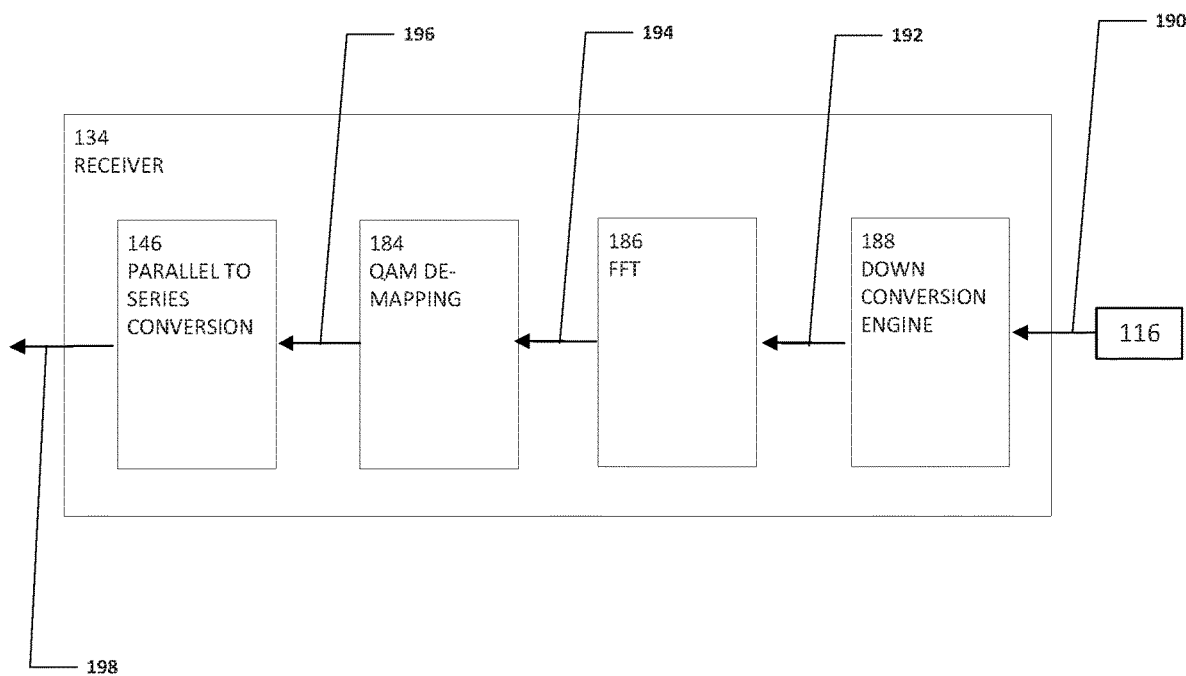
FIG. 6 illustrates an example portion of a system that may use an orthogonal frequency division multiplexing single sideband transmission over a waveguide, in accordance with various embodiments.

Turning to FIG. 6, FIG. 6 is a simplified block diagram of an example of a receiver 134 for receiving a communication over a waveguide 118 in system 100. As illustrated in FIG. 6, receiver 134 can include a parallel to series conversion engine 146, a QAM de-mapping engine 184, an FFT engine 186, and a down conversion engine 188. In an example, waveguide interconnect 116 can receive a signal from waveguide 118. The signal may have been sent from a transmitter similar to transmitter 132 illustrated in FIG. 2. Waveguide interconnect 116 can communicate received signal 190 to down conversion engine 188. Down conversion engine 188 can down convert the received signal 190 to create downconverted signal 192 and communicate downconverted signal 192 to FFT engine 186. FFT engine 186 can divide the signal into its frequency components to create a frequency component signal 194 and communicate frequency component signal 194 to QAM de-mapping engine 184. QAM de-mapping engine 184 can demap frequency component signal 194 to create demapped signal 196 and communicate demapped signal 196 to parallel to series conversion engine 146. Parallel to series conversion engine 146 can be configured to convert the data in demapped signal 196 from parallel to serial (e.g., serialize the data) and generate a serialized bit data stream 198.

Figure 7:
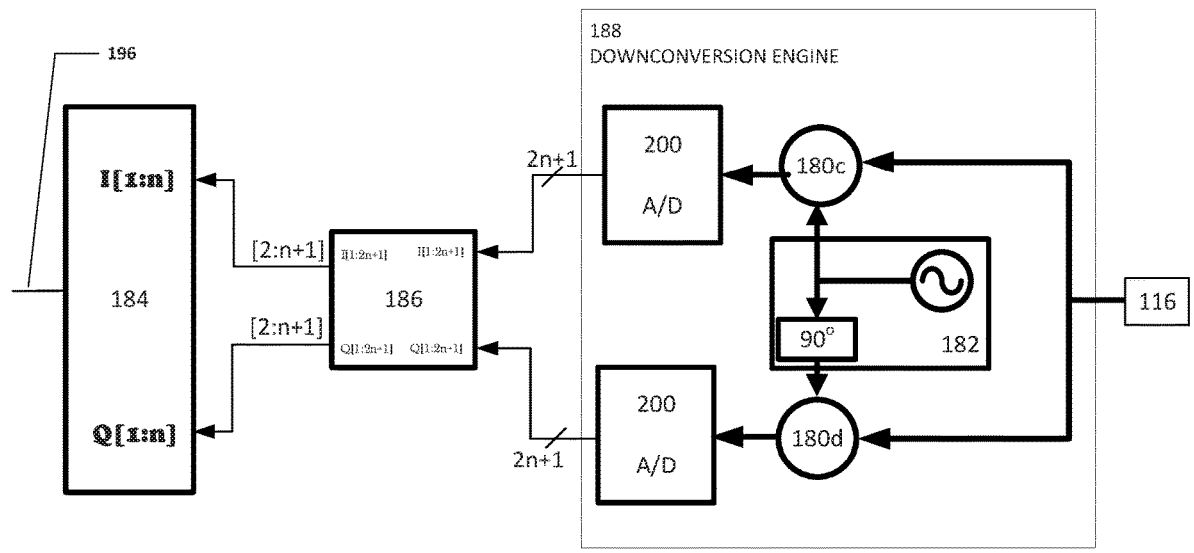
FIG. 7 illustrates an example portion of a system that may use an orthogonal frequency division multiplexing single sideband transmission over a waveguide, in accordance with various embodiments.

Turning to FIG. 7, FIG. 7 is a simplified block diagram of an example of a portion of receiver 134 for use in system 100. As illustrated in FIG. 7, a signal from waveguide interconnect 116 is sent to both mixers 180c and 180d and phase shifter block 182. The signal may have been sent from a transmitter similar to transmitter 132 illustrated in FIG. 2 and waveguide interconnect 116 can receive the signal from waveguide 118.

The resulting output signals of mixers 180c and 180d and phase shifter block 182 are communicated to analog to digital converters 200. The signals from analog to digital converters 200 are communicated to FFT engine 186. FFT engine 186 performs an FFT on the signal and communicates the signals to QAM de-mapping engine 184. QAM de-mapping engine 184 demaps the signal and communicates the signal to parallel to series conversion engine 146 (illustrated in FIG. 6).

It is to be understood that other embodiments may be utilized and structural changes may be made without departing from the scope of the present disclosure. Substantial flexibility is provided by system 100 in that any suitable arrangements and configuration may be provided without departing from the teachings of the present disclosure. Elements of FIG. 1 may be coupled to one another through one or more interfaces employing any suitable connections (wired or wireless), which provide viable pathways for network (e.g., network 104, etc.) communications. Additionally, any one or more of these elements of FIG. 1 may be combined or removed from the architecture based on particular configuration needs. System 100 may include a configuration capable of TCP/IP communications for the transmission or reception of packets in a network. System 100 may also operate in conjunction with a User Datagram Protocol/IP (UDP/IP) or any other suitable protocol where appropriate and based on particular needs.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Other Notes and Examples

In Example M1, a method can include receiving a data stream, converting the data stream to a quadrature amplitude modulation (QAM) mapping/shaping signal, wherein the QAM mapping/shaping signal is a frequency component of the data stream, converting the QAM mapping/shaping signal to a Hilbert transform signal, wherein the Hilbert transform signal includes a reverse order of an in-phase component of the QAM mapping/shaping signal and a reverse order of a quadrature component of the QAM mapping/shaping signal, converting the Hilbert transform signal to a QAM mapping/shaping signal, wherein the QAM mapping/shaping signal is a single sideband (SSB) time domain mm wave signal, wherein the SSB time domain mm wave signal is the Hilbert transform signal converted to a time domain signal, and communicating the SSB time domain mm wave signal over a waveguide using a waveguide interconnect.

In Example, M2, the subject matter of Example M1 can optionally include removing a negative frequency component of the Hilbert transform signal to create the SSB time domain mm wave signal.

In Example M3, the subject matter of any one of Examples M1-M2 can optionally include creating a positive polarity of a negative frequency component of the signal, creating a negative polarity of a conjugate version of the negative frequency component of the signal, and combining the positive polarity of the negative frequency component of the signal with the negative polarity of the conjugate version of the negative frequency component of the signal, wherein the positive polarity of the negative frequency component of the signal and the negative polarity of the conjugate version of the negative frequency component of the signal cancel each other out and remove the negative frequency component of the signal to create the SSB time domain mm wave signal.

In Example M4, the subject matter of any one of Examples M1-M3 can optionally include creating a conjugate version and a minus version of an in-phase component of the Hilbert transform signal and a reverse order of the quadrature component of the Hilbert transform signal to convert the Hilbert transform signal to the SSB time domain mm wave signal.

In Example M5, the subject matter of any one of Examples M1-M4 can optionally include where the data stream is a serial data stream and a receiver converts the serial data stream to a parallel data stream before the data stream is converted to a QAM mapping/shaping signal.

In Example M6, the subject matter of any one of Examples M1-M5 can optionally include upconverting the SSB time domain mm wave signal before the waveguide interconnect communicates the SSB time domain mm wave signal over the waveguide.

In Example M7, the subject matter of any one of Examples M1-M6 can optionally include where an upconversion engine upconverts the SSB time domain mm wave signal and the upconversion engine includes a digital to analog converter and a phase shifter.

In Example A1, an interconnect to communicate a single sideband time domain millimeter wave signal over a waveguide can include a receiver to receive a data stream, a quadrature amplitude modulation (QAM) mapping/shaping engine to create a QAM mapping/shaping signal, wherein the QAM mapping/shaping signal is a frequency component of the data stream, a Hilbert transform engine to create a Hilbert transform signal, wherein the Hilbert transform signal includes a reverse order of an in-phase component of the QAM mapping/shaping signal and a reverse order of a quadrature component of the QAM mapping/shaping signal, and an inverse fast Fourier transform-orthogonal frequency-division multiplexing (IFFT-OFDM) engine to create an SSB time domain millimeter (mm) wave signal, wherein the SSB time domain mm wave signal is the Hilbert transform signal converted to a time domain signal.

In Example, A2, the subject matter of Example A1 can optionally include where a positive frequency component of the Hilbert transform signal is removed to create the SSB time domain mm wave signal.

In Example A3, the subject matter of any one of Examples A1-A2 can optionally include where the positive frequency component of the signal is removed by creating a positive polarity of the positive frequency component of the signal and a negative polarity of a conjugate version of the positive frequency component of the signal and combining the positive polarity of the positive frequency component of the signal and the negative polarity of the conjugate version of the positive frequency component of the signal.

In Example A4, the subject matter of any one of Examples A1-A3 can optionally include where the IFFT-OFDM engine converts the signal to a time domain signal by creating a conjugate version and a minus version of an in-phase component of the Hilbert transform signal and a reverse order of a quadrature component of the Hilbert transform signal.

In Example A5, the subject matter of any one of Examples A1-A4 can optionally include where the data stream is a serial data stream and the receiver converts the serial data stream to a parallel data stream.

In Example A6, the subject matter of any one of Examples A1-A5 can optionally include where the QAM mapping/shaping engine is configured to map each symbol in the data stream to a complex number.

In Example A7, the subject matter of any one of Examples A1-A6 can optionally include an upconversion engine to upconvert the SSB time domain mm wave signal before the interconnect communicates the SSB time domain mm wave signal over the waveguide.

In Example A8, the subject matter of any one of Examples A1-A7 can optionally include where the upconversion engine includes a digital to analog converter and a phase shifter.

Example S1 is a system for enabling a single sideband (SSB) time domain millimeter (mm) wave signal transmission over a waveguide, the system including a receiver, a quadrature amplitude modulation (QAM) mapping/shaping engine, a Hilbert transform engine, an inverse fast Fourier transform-orthogonal frequency-division multiplexing (IFFT-OFDM) engine, and a waveguide interconnect.

In Example S2, the subject matter of Example S1 can optionally include where the receiver receives a data stream, the quadrature amplitude modulation (QAM) mapping/shaping engine creates a QAM mapping/shaping signal, wherein the QAM mapping/shaping signal is a frequency component of the data stream, the Hilbert transform engine creates a Hilbert transform signal, wherein the Hilbert transform signal includes a reverse order of an in-phase component of the QAM mapping/shaping signal and a reverse order of a quadrature component of the QAM mapping/shaping signal, the IFFT-OFDM engine creates an SSB time domain mm wave signal, wherein the SSB time domain mm wave signal is the Hilbert transform signal converted to a time domain signal, and the waveguide interconnect communicates the SSB time domain mm wave signal over the waveguide.

In Example S3, the subject matter of any of the Examples S1-S2 can optionally include where the IFFT-OFDM engine converts the signal to a time domain signal by creating a conjugate version and a minus version of an in-phase component of the Hilbert transform signal and a reverse order of a quadrature component of the Hilbert transform signal.

In Example S4, the subject matter of any of the Examples S1-S3 can optionally include where the data stream is a serial data stream and the receiver converts the serial data stream to a parallel data stream.

In Example S5, the subject matter of any of the Examples S1-S4 can optionally include an upconversion engine to upconvert the SSB time domain mm wave signal before the waveguide interconnect communicates the SSB time domain mm wave signal over the waveguide.

Example SS1 is a system for enabling a single side band (SSB) transmission over a waveguide, the system including means for receiving a data stream, converting the data stream to a quadrature amplitude modulation (QAM) mapping/shaping signal, wherein the QAM mapping/shaping signal is a frequency component of the data stream, means for converting the QAM mapping/shaping signal to a Hilbert transform signal, wherein the Hilbert transform signal includes a reverse order of an in-phase component of the QAM mapping/shaping signal and a reverse order of a quadrature component of the QAM mapping/shaping signal, means for converting the Hilbert transform signal to a QAM mapping/shaping signal, wherein the QAM mapping/shaping signal is a single sideband (SSB) time domain mm wave signal, wherein the SSB time domain mm wave signal is the Hilbert transform signal converted to a time domain signal, and means for communicating the SSB time domain mm wave signal over a waveguide using a waveguide interconnect.

In Example SS2, the subject matter of Example SS1 can optionally include means for removing a negative frequency component of the Hilbert transform signal to create the SSB time domain signal.

In Example SS3, the subject matter of any of the Examples SS1-SS2 can optionally include means for creating a positive polarity of a negative frequency component of the signal, means for creating a negative polarity of a conjugate version of the negative frequency component of the signal, and means for combining the positive polarity of the negative frequency component of the signal with the negative polarity of the conjugate version of the negative frequency component of the signal, wherein the positive polarity of the negative frequency component of the signal and the negative polarity of the conjugate version of the negative frequency component of the signal cancel each other out and remove the negative frequency component of the signal to create the SSB time domain mm wave signal.

In Example SS4, the subject matter of any of the Examples SS1-SS3 can optionally include means for creating a conjugate version and a minus version of an in-phase component of the Hilbert transform signal and a reverse order of the quadrature component of the Hilbert transform signal to convert the Hilbert transform signal to the SSB time domain signal.

In Example SS5, the subject matter of any of the Examples SS1-SS4 can optionally include where the data stream is a serial data stream and a receiver converts the serial data stream to a parallel data stream before the data stream is converted to a QAM mapping/shaping signal.

In Example SS6, the subject matter of any of the Examples SS1-SS5 can optionally include means for upconverting the SSB time domain signal before the waveguide interconnect communicates the SSB time domain signal over the waveguide In Example SS7, the subject matter of any of the Examples SS1-SS6 can optionally include where an upconversion engine upconverts the SSB time domain signal and the upconversion engine includes a digital to analog converter and a phase shifter.

Example X1 is a machine-readable storage medium including machine-readable instructions to implement a method or realize an apparatus as in any one of the Examples M1-M7, A1-A8, or SS1-SS7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A method comprising:
   receiving a data stream;
   converting the data stream to a quadrature amplitude modulation (QAM) mapping/shaping signal;
   converting the QAM mapping/shaping signal to a Hilbert transform signal, wherein the Hilbert transform signal includes a reverse order of an in-phase component of the QAM mapping/shaping signal and a reverse order of a quadrature component of the QAM mapping/shaping signal;
   converting the Hilbert transform signal to a QAM mapping/shaping signal, wherein the QAM mapping/shaping signal is a single sideband (SSB) time domain millimeter (mm) wave signal, wherein the SSB time domain mm wave signal is the Hilbert transform signal converted to a time domain signal; and
   communicating the SSB time domain mm wave signal over a waveguide using a waveguide interconnect.

2. The method of claim 1, further comprising:
   removing a negative frequency component of the Hilbert transform signal to create the SSB time domain mm wave signal.

3. The method of claim 1, further comprising:
   creating a positive polarity of a negative frequency component of the signal;
   creating a negative polarity of a conjugate version of the negative frequency component of the signal; and
   combining the positive polarity of the negative frequency component of the signal with the negative polarity of the conjugate version of the negative frequency component of the signal, wherein the positive polarity of the negative frequency component of the signal and the negative polarity of the conjugate version of the negative frequency component of the signal cancel each other out and remove the negative frequency component of the signal to create the SSB time domain mm wave signal.

4. The method of claim 1, further comprising:
   creating a conjugate version and a minus version of an in-phase component of the Hilbert transform signal and a reverse order of the quadrature component of the Hilbert transform signal to convert the Hilbert transform signal to the SSB time domain mm wave signal.

5. The method of claim 1, wherein the data stream is a serial data stream and a receiver converts the serial data stream to a parallel data stream before the data stream is converted to a QAM mapping/shaping signal.

6. The method of claim 1, further comprising:
   upconverting the SSB time domain mm wave signal before the waveguide interconnect communicates the SSB time domain mm wave signal over the waveguide.

7. The method of claim 6, wherein an upconversion engine upconverts the SSB time domain mm wave signal and the upconversion engine includes:
   a digital to analog converter; and
   a phase shifter.

8. An interconnect to communicate a single sideband time domain millimeter wave signal over a waveguide, the interconnect comprising:
   one or more processors;
   a receiver to receive a data stream;
   a quadrature amplitude modulation (QAM) mapping/shaping engine to cause at least one of the one or more processors to create a QAM mapping/shaping signal;
   a Hilbert transform engine to cause at least one of the one or more processors to create a Hilbert transform signal, wherein the Hilbert transform signal includes a reverse order of an in-phase component of the QAM mapping/shaping signal and a reverse order of a quadrature component of the QAM mapping/shaping signal; and
   an inverse fast Fourier transform-orthogonal frequency-division multiplexing (IFFT-OFDM) engine to cause at least one of the one or more processors to create an SSB time domain millimeter (mm) wave signal, wherein the SSB time domain mm wave signal is the Hilbert transform signal converted to a time domain signal.

9. The interconnect of claim 8, wherein a positive frequency component of the Hilbert transform signal is removed to create the SSB time domain mm wave signal.

10. The interconnect of claim 9, wherein the positive frequency component of the signal is removed by creating a positive polarity of the positive frequency component of the signal and a negative polarity of a conjugate version of the positive frequency component of the signal and combining the positive polarity of the positive frequency component of the signal and the negative polarity of the conjugate version of the positive frequency component of the signal.

11. The interconnect of claim 8, wherein the IFFT-OFDM engine converts the signal to a time domain signal by creating a conjugate version and a minus version of an in-phase component of the Hilbert transform signal and a reverse order of a quadrature component of the Hilbert transform signal.

12. The interconnect of claim 8, wherein the data stream is a serial data stream and the receiver converts the serial data stream to a parallel data stream.

13. The interconnect of claim 8, wherein the QAM mapping/shaping engine is configured to map each symbol in the data stream to a complex number.

14. The interconnect of claim 8, further comprising:
    an upconversion engine to upconvert the SSB time domain mm wave signal before the interconnect communicates the SSB time domain mm wave signal over the waveguide, wherein the upconversion engine includes:
    a digital to analog converter; and
    a phase shifter.

15. A system for enabling a single sideband (SSB) time domain millimeter (mm) wave signal transmission over a waveguide, the system comprising:
    a transmitter;
    a receiver, wherein the receiver receives a data stream from the transmitter;
    one or more processors;

a quadrature amplitude modulation (QAM) mapping/ shaping engine, wherein QAM mapping/shaping engine causes at least one of the one or more processors to create a QAM mapping/shaping signal, wherein the QAM mapping/shaping signal is a frequency component of the data stream;

a Hilbert transform engine, wherein the Hilbert transform engine causes at least one of the one or more processors to receive the QAM mapping/shaping signal and create a Hilbert transform signal, wherein the Hilbert transform signal includes a reverse order of an in-phase component of the QAM mapping/shaping signal and a reverse order of a quadrature component of the QAM mapping/shaping signal;

an inverse fast Fourier transform-orthogonal frequency-division multiplexing (IFFT-OFDM) engine, wherein the IFFT-OFDM engine causes at least one of the one or more processors to convert the Hilbert transform signal into an SSB time domain mm wave signal; and a waveguide interconnect to transmit the SSB time domain mm wave signal over a waveguide.

16. The system of claim 15, wherein:

the Hilbert transform engine creates a Hilbert transform signal, wherein the Hilbert transform signal includes a reverse order of an in-phase component of the QAM mapping/shaping signal and a reverse order of a quadrature component of the QAM mapping/shaping signal;

the IFFT-OFDM engine creates an SSB time domain mm wave signal, wherein the SSB time domain mm wave signal is the Hilbert transform signal converted to a time domain signal; and the waveguide interconnect communicates the SSB time domain mm wave signal over the waveguide.

17. The system of claim 16, wherein the IFFT-OFDM engine converts the signal to a time domain signal by creating a conjugate version and a minus version of an in-phase component of the Hilbert transform signal and a reverse order of a quadrature component of the Hilbert transform signal.

18. The system of claim 16, wherein the data stream is a serial data stream and the receiver converts the serial data stream to a parallel data stream.

19. The system of claim 15, further comprising:

an upconversion engine to upconvert the SSB time domain mm wave signal before the waveguide interconnect communicates the SSB time domain mm wave signal over the waveguide.

20. The method of claim 1, further comprising:

using a series to parallel data conversion to group multiple series data bit streams into a parallel data word as a symbol, wherein the QAM mapping/shaping signal is used to map the symbol to a dedicated QAM constellation.

* * * * *

UNITED STATES PATENT AND TRADEMARK OFFICE
CERTIFICATE OF CORRECTION

PATENT NO. : 10,623,106 B2  
APPLICATION NO. : 16/224008  
DATED : April 14, 2020  
INVENTOR(S) : Hyung-Jin Lee et al.

Page 1 of 1

It is certified that error appears in the above-identified patent and that said Letters Patent is hereby corrected as shown below:

On the Title Page

In the illustrative figure, Line 6, delete "MAPING/" and insert -- MAPPING/ --.

In the Drawings

On sheet 2 of 7, in FIG. 2, Line 6, delete "MAPING/" and insert -- MAPPING/ --, therefor.

In the Claims

In Column 17, Lines 4-6, in Claim 15, delete "- -, wherein the QAM mapping/shaping signal is a frequency component of the data stream- -".

Signed and Sealed this
Eleventh Day of August, 2020

Andrei Iancu
*Director of the United States Patent and Trademark Office*